(12) United States Patent
Qin

(10) Patent No.: US 9,458,897 B2
(45) Date of Patent: Oct. 4, 2016

(54) ACCESSORY DRIVE WITH FRICTION CLUTCH

(71) Applicant: BorgWarner Inc., Auburn Hills, MI (US)

(72) Inventor: Shiwei Qin, Battle Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 192 days.

(21) Appl. No.: 14/149,694

(22) Filed: Jan. 7, 2014

(65) Prior Publication Data

US 2014/0174875 A1  Jun. 26, 2014

Related U.S. Application Data

(63) Continuation-in-part of application No. 14/135,280, filed on Dec. 19, 2013.

(60) Provisional application No. 61/745,647, filed on Dec. 24, 2012.

(51) Int. Cl.
| | |
|---|---|
| *F16D 13/44* | (2006.01) |
| *F16D 27/112* | (2006.01) |
| *F16D 27/00* | (2006.01) |

(52) U.S. Cl.
CPC ....... *F16D 27/112* (2013.01); *F16D 2027/008* (2013.01)

(58) Field of Classification Search
CPC ........................ F16D 27/112; F16D 2027/008
See application file for complete search history.

(56) References Cited

U.S. PATENT DOCUMENTS

| | | | |
|---|---|---|---|
| 2,991,864 | A | 7/1961 | Pracher |
| 5,057,728 | A | 10/1991 | Dammeyer et al. |
| 5,295,812 | A | 3/1994 | Steele |
| 5,551,546 | A | 9/1996 | Tabayama et al. |
| 5,984,068 | A | 11/1999 | Reed, Jr. |
| 6,071,205 | A | 6/2000 | Ohno et al. |
| 6,119,841 | A | 9/2000 | Orlamunder |
| 6,488,133 | B1 | 12/2002 | Maurice et al. |
| 6,561,336 | B1 | 5/2003 | Huart et al. |
| 6,868,809 | B1 | 3/2005 | Robb |
| 6,974,010 | B2 | 12/2005 | Machida et al. |
| RE39,795 | E | 8/2007 | Wright |
| 7,267,214 | B2 | 9/2007 | Bittner et al. |
| 7,841,456 | B2 | 11/2010 | Pescheck et al. |
| 8,256,598 | B2 | 9/2012 | Buzzard |
| 8,371,426 | B2 | 2/2013 | Hoshino et al. |
| 8,678,152 | B2 | 3/2014 | Kuwabara |
| 8,851,258 | B2 | 10/2014 | Komorowski et al. |

(Continued)

FOREIGN PATENT DOCUMENTS

| | | |
|---|---|---|
| CN | 201721321 U | 1/2011 |
| CN | 102085801 A | 6/2011 |
| WO | WO-2012/142016 A2 | 10/2012 |

*Primary Examiner* — David J Hlavka

(74) *Attorney, Agent, or Firm* — Harness, Dickey & Pierce, P.L.C.

(57) ABSTRACT

An ON-OFF vehicle accessory for driving vehicle cooling pump or cooling fan. The accessory having a friction clutch assembly with a friction plate member connected to a central rotatable shaft member. A biased armature member is adapted to force a friction plate member with friction linings thereon against a housing or cover which is rotating at input speed. A solenoid assembly is used to overcome the spring bias and pull the armature and friction plate member away from the housing.

24 Claims, 6 Drawing Sheets

(56) References Cited

U.S. PATENT DOCUMENTS

| | | | |
|---|---|---|---|
| 8,978,600 B2 | 3/2015 | Shutty et al. | |
| 9,004,251 B2 | 4/2015 | Ikegawa | |
| 9,140,313 B2 | 9/2015 | Ikegawa | |
| 9,217,476 B2 | 12/2015 | Roby | |
| 9,279,460 B2 | 3/2016 | Qin | |
| 2002/0108588 A1 | 8/2002 | Komorowski | |
| 2003/0008741 A1 | 1/2003 | Fadler et al. | |
| 2003/0029392 A1 | 2/2003 | Komorowski | |
| 2003/0029393 A1 | 2/2003 | Komorowski | |
| 2007/0227853 A1 | 10/2007 | Pardee | |
| 2009/0047162 A1 | 2/2009 | Uchikado et al. | |
| 2009/0272615 A1 | 11/2009 | Buzzard | |
| 2010/0126822 A1* | 5/2010 | Winkler | F16D 27/112 192/90 |
| 2012/0133465 A1 | 5/2012 | Staniewicz et al. | |
| 2013/0075219 A1 | 3/2013 | Onitake et al. | |
| 2013/0093547 A1 | 4/2013 | Staniewicz et al. | |
| 2013/0098730 A1 | 4/2013 | Danciu et al. | |
| 2013/0175134 A1 | 7/2013 | Boyes et al. | |
| 2013/0187736 A1 | 7/2013 | Staniewicz et al. | |
| 2013/0306005 A1* | 11/2013 | Shutty | F01P 7/164 123/41.47 |
| 2013/0313068 A1 | 11/2013 | Mevissen et al. | |
| 2014/0023526 A1 | 1/2014 | Roby | |
| 2014/0076683 A1 | 3/2014 | Williams | |
| 2014/0141892 A1 | 5/2014 | Williams | |
| 2014/0174873 A1* | 6/2014 | Qin | F16D 27/06 192/66.32 |
| 2014/0174874 A1* | 6/2014 | Qin | F16D 13/76 192/66.32 |
| 2014/0238809 A1 | 8/2014 | Boyes et al. | |
| 2015/0075935 A1 | 3/2015 | Kitayama et al. | |
| 2015/0184575 A1 | 7/2015 | Shutty et al. | |
| 2015/0285365 A1 | 10/2015 | Canto Michelotti | |
| 2016/0040733 A1 | 2/2016 | Staniewicz et al. | |

\* cited by examiner

ACCESSORY DRIVE WITH FRICTION CLUTCH

This application is a continuation-in-part of U.S. patent application Ser. No. 14/135,280 filed on Dec. 19, 2013, which claims the benefit of U.S. Provisional Patent Application Ser. No. 61/745,647, filed on Dec. 24, 2012.

TECHNICAL FIELD

The present disclosure relates to electronically-operated clutch assemblies for use in vehicle accessories, such as coolant pumps and fans.

BACKGROUND

Vehicle engine accessories, such as water pumps and cooling fans, are in common use in automobiles and other vehicles. These accessories are typically driven by a belt attached to the crankshaft of the engine and thus operate at some percentage of engine speed. The water pumps have an impeller that is used to circulate the engine coolant from the engine to the radiator and back in order to keep the coolant within acceptable temperature limits. Cooling fans have a fan with blades that supplies atmosphere air to, for example, a radiator to cool the engine coolant.

Efforts are being made today to reduce the power consumption of engine accessories, such as water pumps and fan drives, in order to improve fuel economy and reduce emissions. It would thus be preferable if such accessories could be made to operate only when needed in order to reduce the load on the engine and, in turn, improve fuel economy and reduce undesirable emissions from the engine.

SUMMARY OF THE INVENTION

A vehicle accessory on-off drive assembly, such as a cooling pump or fan drive, having an improved dry friction clutch mechanism is disclosed. The accessory drive is mechanically driven by an engine belt. The components are included as part of a multi-component assembly that includes a pulley member. The pulley is turned at input speed by an engine belt positioned on the pulley member. A shaft connected to the impeller of a water pump, or the blades of a fan, is positioned in the assembly and is controlled by the mechanical operation.

The friction clutch assembly is positioned inside a housing and selectively allows operation of the accessory by the pulley member. The dry friction clutch assembly is activated by turning on/off a solenoid. In one embodiment, when the solenoid is off for any reason, the clutch will be engaged, and thus the clutch is fail-safe. In this condition, one or more spring or biasing members bias a plate which clamps a friction member against the cover. Torque is transferred through the friction plate.

The clutch is disengaged by activating the solenoid. When the solenoid is on, the solenoid force overcomes the force of the biasing members and causes the plate to contact the pulley, and another spring or biasing member spaces the plate away from the cover and holds it against a stop, creating air gaps on both sides of the plate. When the clutch is disengaged, the input (pulley) and output (shaft) are disconnected eliminating interaction (and bearing drag) between the input and output.

Further objects, features and benefits of the invention are set forth below in the following description of the invention when viewed in combination with the drawings and claims.

DESCRIPTION OF THE PREFERRED EMBODIMENTS

Figure 1:
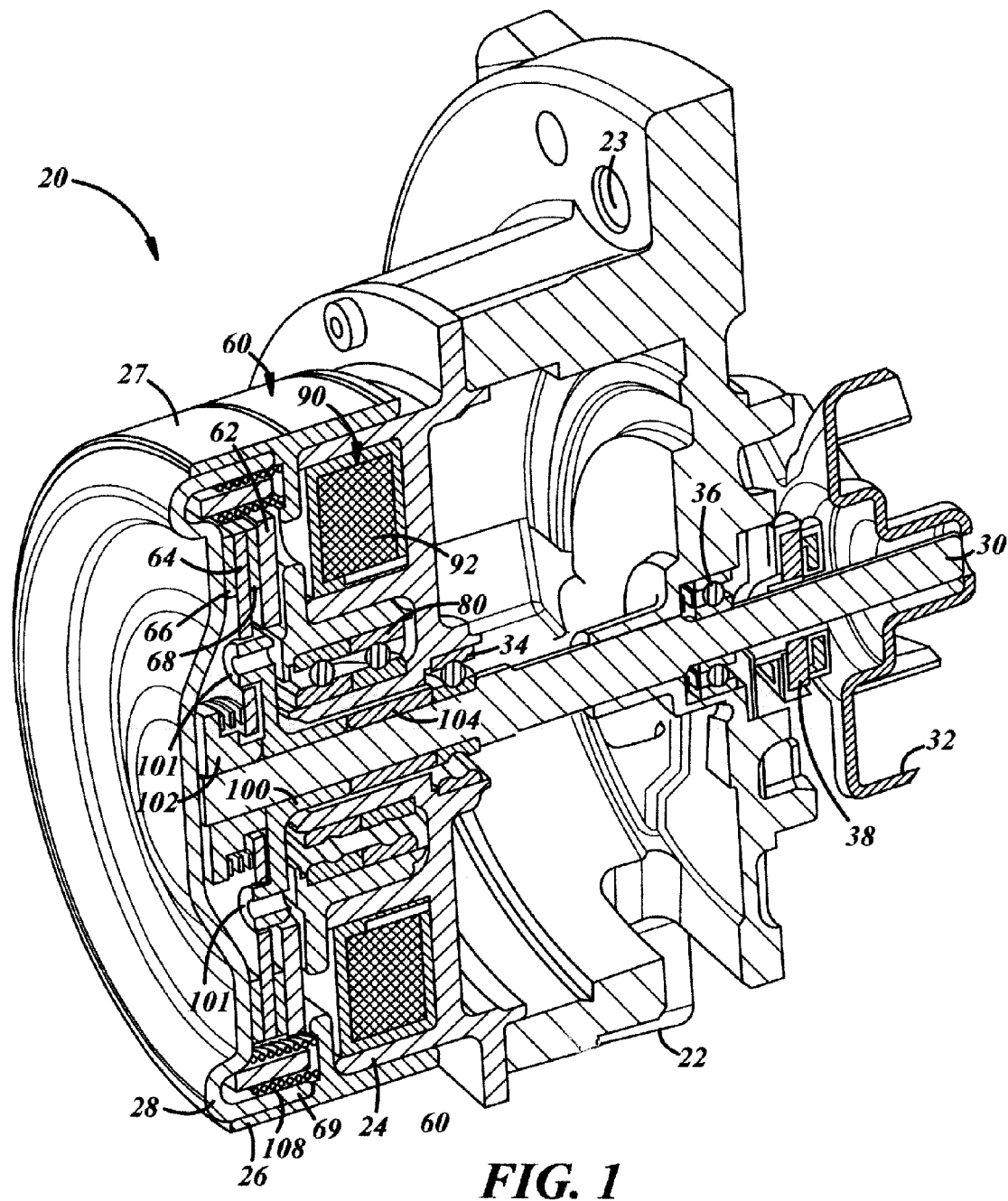
FIG. 1 is a cross-sectional view of a vehicle accessory assembly which incorporates an embodiment of the present invention.

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons or ordinary skill in the art to which the invention relates.

The present inventions described herein relate to dual mode friction clutch assemblies particularly used for accessories, such as coolant pumps and fans which circulate coolant or air into or through an engine, such as an automobile internal combustion engine. (The terms "water pump" and "coolant pump" are used interchangeably herein.) The present invention, however, can also be used for other engine accessory devices.

The preferred coolant pump embodiment of the present invention as described herein is particularly adapted for use with trucks, passenger cars and off-highway vehicles, and will be described with respect to its use in a coolant pump. It is to be understood that the patent invention is not to be limited or restricted to use as a coolant pump, or limited to the precise structure and operation as described herein.

A water pump embodiment with a friction clutch assembly in accordance with the present invention is shown in FIGS. 1-5 and referred to generally by the reference numeral 20. The hybrid water pump includes a motor housing 22, a solenoid housing 24, a pulley member 26 and a cover member 28. A central shaft member 30 is rotated by the pump 20 which operates the water pump impeller 32. As shown, the pulley member has a smooth outer surface 27 on which an engine belt (not shown) is positioned. The outer surface of the pulley member could also comprise circumferential grooves or any other conventional structure for mating with an engine belt with corresponding grooves or mating structure.

Figure 2A:
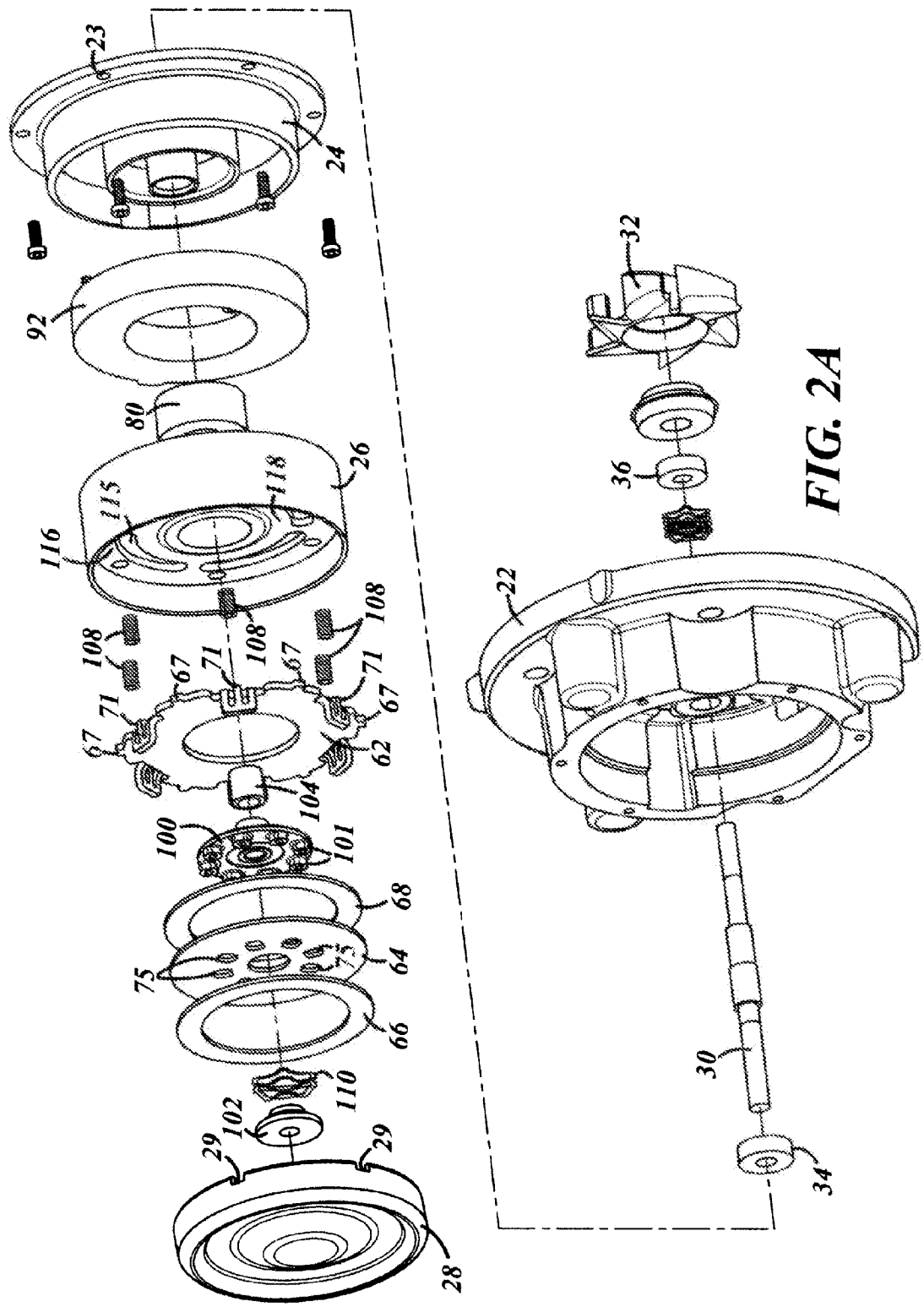
FIG. 2A and 2B are exploded views of the components of the assembly as shown in FIG. 1.
Figure 2B:
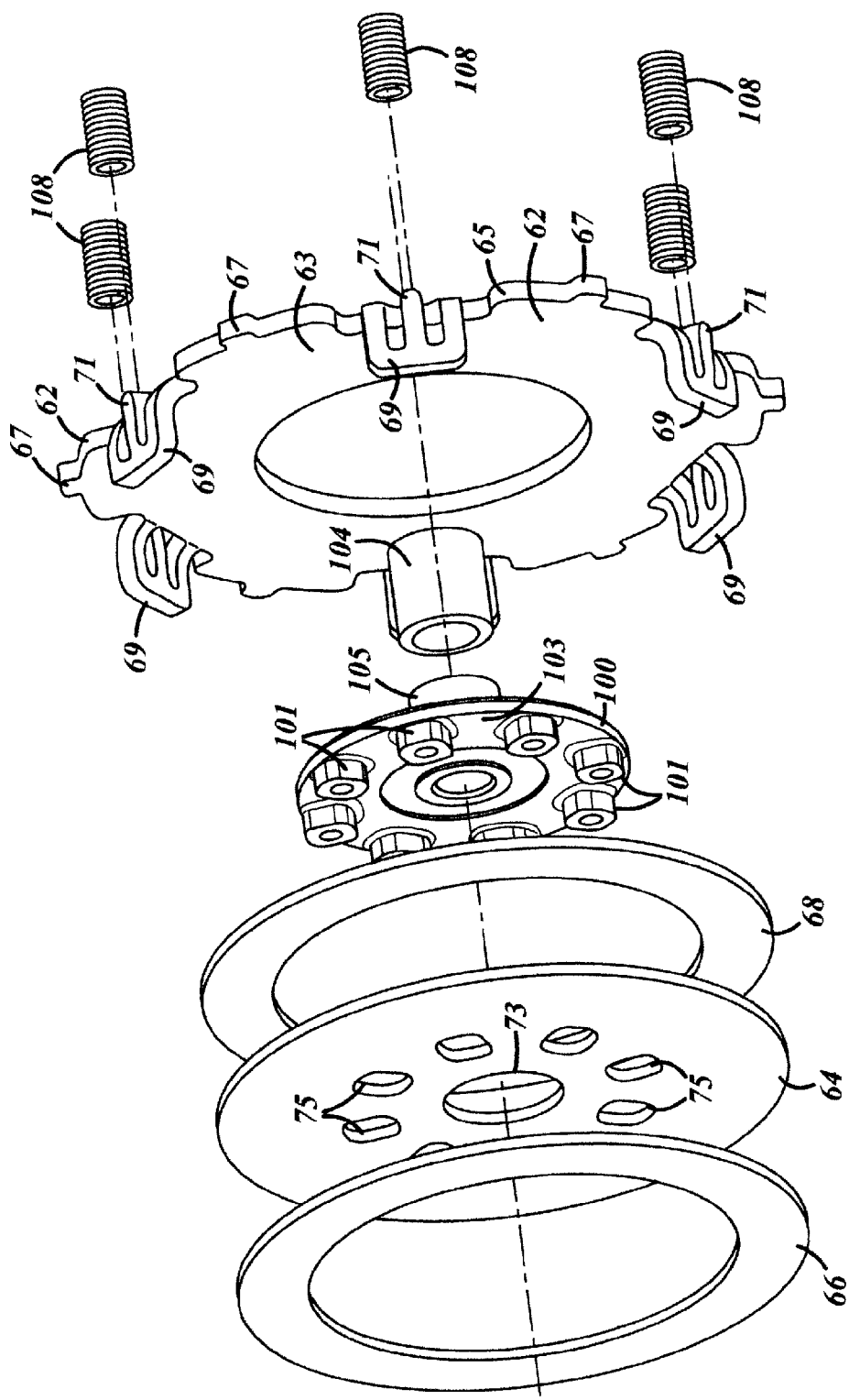
Figure 3:
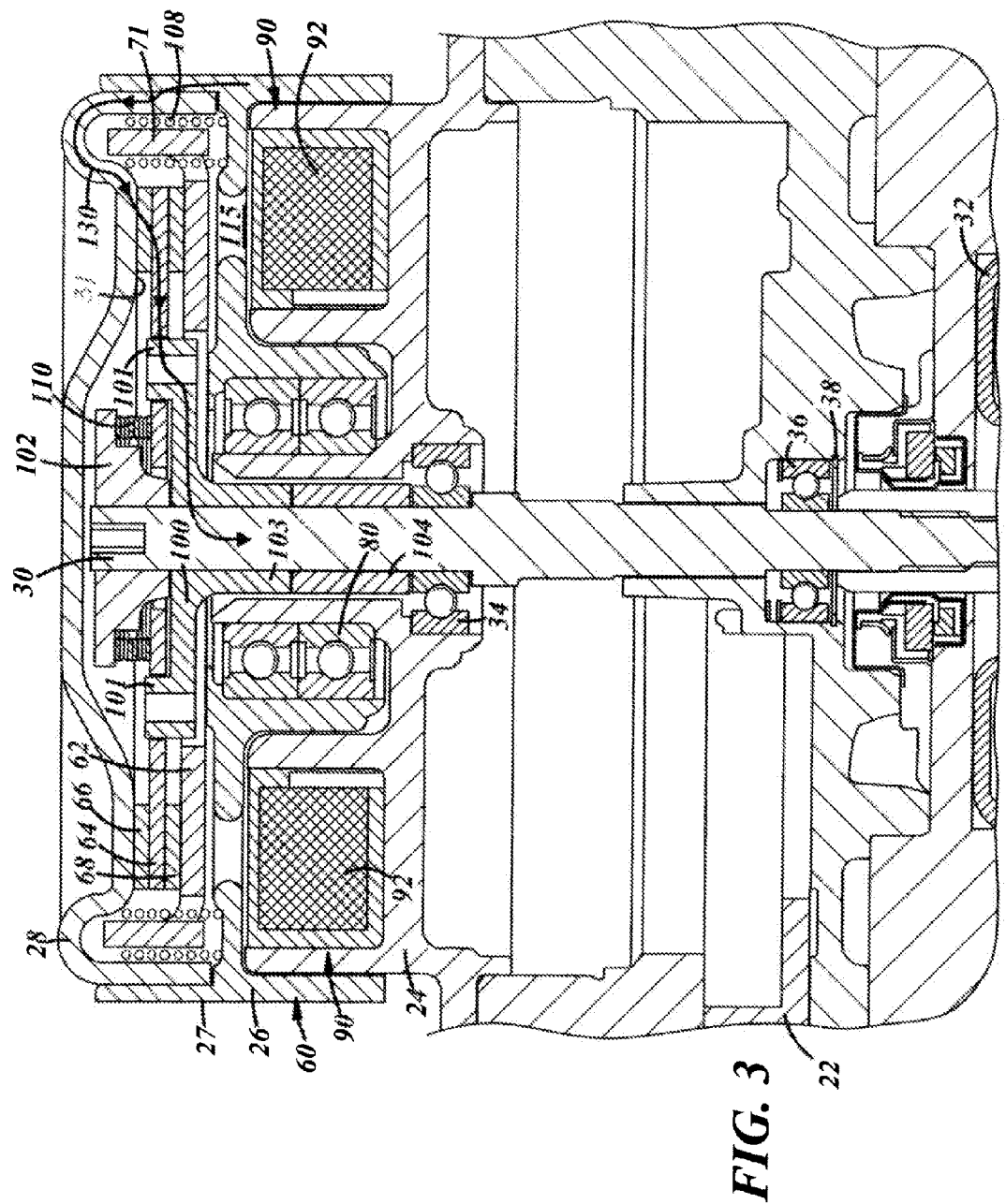
FIG. 3 is an enlarged cross-sectional view of the assembly shown in FIGS. 1 with the components shown in the engaged position.
Figure 4:
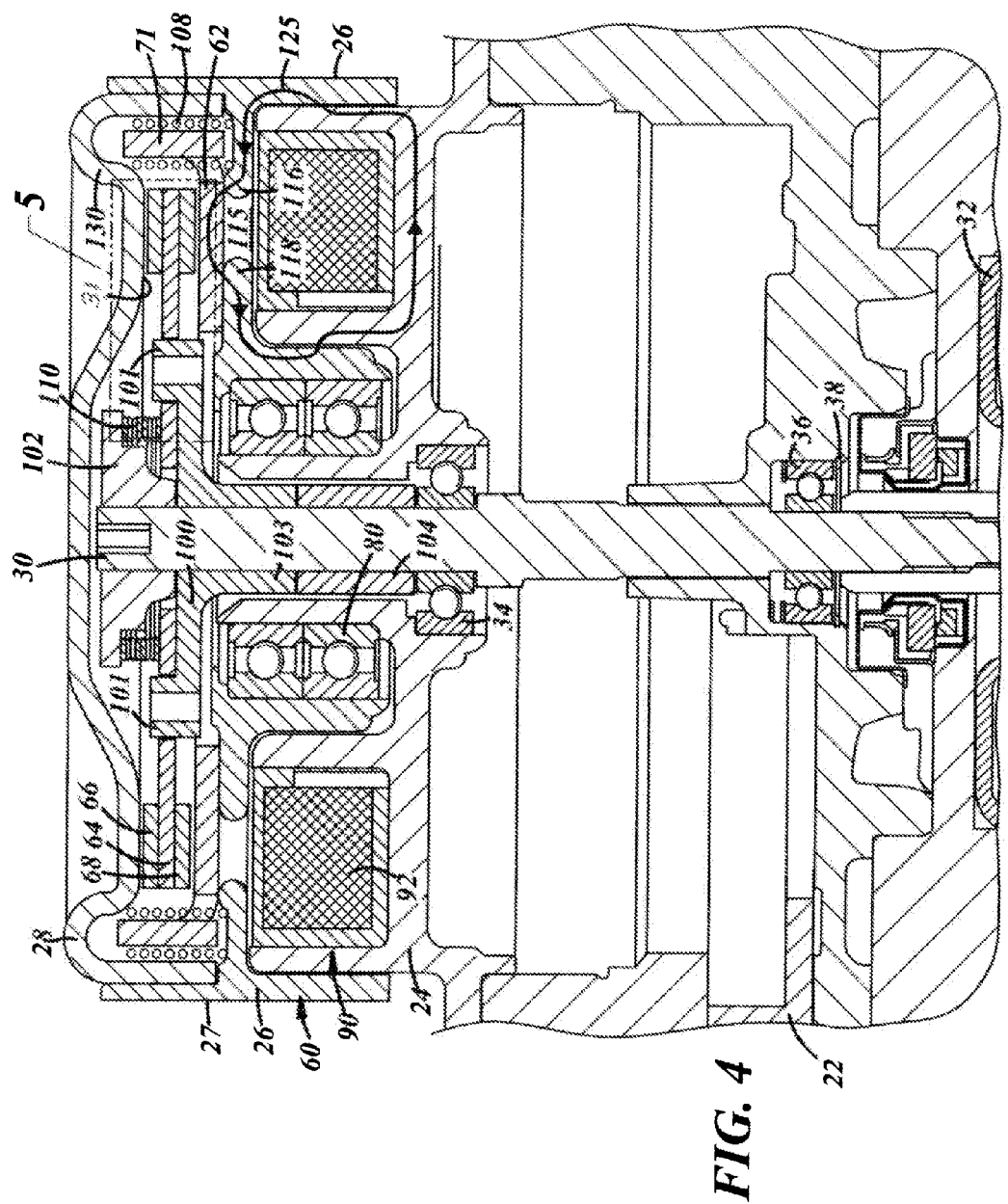
FIG. 4 is an enlarged cross-sectional view of the assembly shown in FIGS. 1 with the components shown in the disengaged position.
Figure 5:
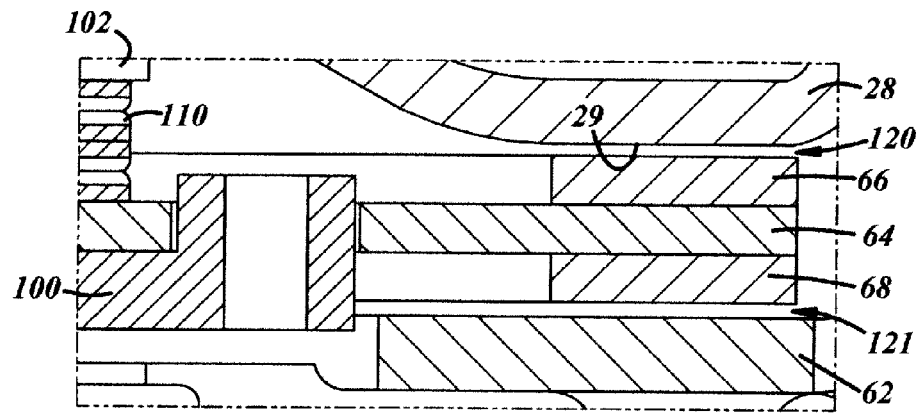
FIG. 5 is an enlarged view of a portion of the cross-section shown in FIG. 4.

Exploded views of the components of the water pump assembly 20 are shown in FIGS. 2A and 2B. Enlarged views showing the friction clutch mechanism in the solenoid deactivated and activated modes of operation are shown in FIGS. 3-5.

The impeller shaft 30 is held in place in the multi-component assembly by bearings 34 and 36. A coolant seal 38 is used to prevent coolant in the pump from leaking into the motor housing.

The motor housing 22 has a plurality of mounting members, such as fastener opening 23, as shown in the drawings. Other openings are also provided for attachment of the water pump assembly 20 inside the engine compartment of a vehicle. The size, positioning and number of mounting members will depend on the type of accessory and the location in the vehicle and/or on the engine where the accessory is to be mounted.

The friction clutch assembly is designated generally by the reference numeral 60. The friction clutch assembly generally comprises an armature plate 62, a friction plate 64, and two annular rings of friction material 66 and 68. The armature plate 62 is preferably made of a magnetic metal material, such as low carbon steel. The friction plate 64, also called a "clutch plate", is preferably made of a non-magnetic material, such as stainless steel.

The friction materials 66 and 68 can be any conventional friction materials used in friction clutches today, and can be complete rings, segments of rings, or simply pieces of friction material positioned generally where rings 66 and 68 are positioned in the drawings. Preferably, the friction materials 66, 68 are permanently attached to the friction plate 64, such as by a bonding agent.

The cover member 28, which preferably is made of a non-magnetic material, such as stainless steel, is preferably press-fit directly to the pulley member 26. The cover member could also be fixedly attached to the pulley member by other conventional means, such as by welding or a roll-over assembly. Thus, when the pulley is rotated by an engine belt, the cover member 28 rotates with it at the same input speed.

The pulley member 26 is preferably made of a magnetic metal material, such as low carbon steel. The pulley member rotates freely around bearings 80. Although the bearings can be of any type that will have sufficient durability and performance, a pair of stacked bearings can be utilized, as shown in the drawings.

The operation of the friction clutch assembly is performed by a solenoid assembly 90. The solenoid assembly includes a solenoid coil 92 which is positioned in the solenoid housing 24. The solenoid coil member comprises a donut-shaped coil of copper wires, while the solenoid housing is preferably made of a magnetic material, such as low carbon steel. The solenoid coil member 92 can be potted in the solenoid housing 24.

The bearing 34 allows the shaft member 30 to rotate freely relative to the solenoid housing 24.

The armature plate member 62 is shown in more detail in FIGS. 2A and 2B. The armature plate member has an annular base member 63, with a plurality of radially extending flange members 65, each having a tab member 67. A plurality of upturned spring retainer member 69 are also included on the armature plate member.

The tab members 67 are positioned to mate with corresponding notches 29 in the cover member 28. When the accessory member 20 is assembled, the tab members 67 are positioned in the notches 29. The notches have a size to allow the tab members to move axially in them (as the armature plate is moved axially in operation of the accessory). At all times, however, the tab members remain in the notches so that torque can be transferred between the cover member and the armature plate. In this manner, the armature plate and the cover member rotate at input speed with the pulley member 26.

Although six tab members 67 and six mating notches 29 are provided in the preferred embodiment, more or less tabs and notches could be provided, so long as the performances and operation are the same or equivalent.

The spring retainer members 69 have a general "M" shape with an outer U-shaped ring and a middle finger member 71 unconnected at one end. Coil spring members 108 are provided, one of each which is positioned on each of the finger members 71. When the accessory member 20 is assembled, the coil spring members 108 are positioned between the armature plate member 62 and the pulley member 26 and bias the armature plate member in an axial direction away from the pulley member.

Although six coil spring members 108 and six spring retainer members 69 are shown and described herein, there can be more or less of both members, so long as the operation of the accessory member 20 is the same or equivalent. Also, the size and type of spring members that can be utilized in the invention is dependent on many factors, such as the weight of the components needed to be biased, the amount of force necessary to compress them, and the physical limitations of the location at which they are positioned. In addition, even though the biasing members are shown and described to be coil springs, any other comparable biasing members could be utilized so long as the performance and operation of the accessory remain the same or the equivalent.

The friction plate 64 has a circular shape with a central opening 73 for the shaft member 30 and a plurality of smaller openings 75. Also, as indicated above, friction members 66, 68 are positioned on the two sides of the friction plate.

The openings 75 in the friction plate are provided to mate with lug members 101 on stop member 100. The stop member 100 is press fit on the shaft member 30. It has a circulate plate member 103 and a collar member 105 which fits around the shaft member 30. The stop member 100 is preferably made of a non-magnetic material, such as stainless steel. The lug members 101 are positioned on the plate member 103 in location to fit easily with the openings 75 in the friction member. The precise number of mating lug members 101 and openings 75 is not critical. More or less mating features could be provided.

The loose fitting of the lugs 101 in the openings 75 allow the friction plate member 64 to move axially relative to the plate member 100. The lug members also cause the friction plate member 64 to rotate with the shaft member 30.

A nut member 102 is threaded, or otherwise firmly fixed, on the end of the shaft member 30. Positioned on the shaft member 30 between the nut member 102 and the friction plate member 64 is a spring member 110. The spring member 110 provides a biasing force against the friction plate member 64 in an axial direction to prevent the friction member 66 on the plate member 64 from contacting the inner surface 31 of the cover member 28. As explained below, the spring member 110 acts to return the friction plate member 64 to its mechanically disengaged position when the solenoid assembly 90 is activated.

Bearing member 34 in an axial position inside the solenoid housing 24, and determines the axial position of shaft 30. Cylindrical member 104 is provided. The cylindrical member 104 is positioned between the stop member 100 and the bearing member 34.

When the water pump is not operating, the friction clutch assembly 60 is held in a disengaged position by the solenoid assembly 90. This is shown in FIGS. 4 and 5. When the solenoid coil member 92 is electrically activated, a flux circuit 125 is created which acts to pull the armature plate 62 toward the solenoid coil member overcoming the force of the coil spring members 108. With the armature plate 62 pulled toward the solenoid, the return spring 110 holds the friction plate 64 against the stop member 100. In this condition, as more particularly shown in enlarged form in FIG. 5, the friction materials 66, 68 on the friction plate 64 are not in contact with either the cover member 28 or the armature plate 62.

In this mode of operation, there are air gaps 120, 121 on the sides of the friction materials on the friction plate. The input (pulley member) and output (shaft member) are completely disconnected. This eliminates any interaction, such as bearing drag between the input and output.

In order to create an appropriate flux circuit 125, the pulley member 26 has a plurality of openings 115 which create air gaps. The openings 115 essentially form an annular open ring. With the air gaps, the pulley member is, for electromagnetic purposes, essentially an outer annular ring 116 and a separated annular inner ring 118. (This is best shown in FIG. 2A and 4.)

The flux circuit 125 is shown in FIG. 4. It runs through the solenoid housing 24, the belt engaging portion of the pulley member 26, outer annular ring portion 116 of the pulley member 26, and then jumps to the armature plate member 62 and then back to the inner annular ring 118 portion of the pulley member 26 where it returns to the solenoid housing 24. This circuit pulls the armature member 62 tightly to the pulley member 26 when the solenoid assembly is activated.

FIG. 3 depicts the situation where the solenoid assembly 90 is not activated. In this situation, the water pump is driven mechanically by an engine belt. The coil spring members 108 force the armature member 62 in an axial direction away from the pulley member 26 and away from the solenoid assembly 90. This causes the armature member 62 to contact the friction member 68 which in turn forces the friction member 66 to contact the inner surface 31 of the cover member 28. Since the armature member, pulley member and cover member are all fixed together, this causes the shaft member 30 to rotate at the same speed.

A path of torque transfer which mechanically rotates the shaft member is shown by arrows 130 in FIG. 3. In the engaged clutch, the friction plate member is clamped between the cover member and armature member and torque is transferred through both sides of the friction plate.

In the preferred embodiment as shown in the drawings, the present invention provides a "fail-safe" friction clutch design. If the electrical system of the vehicle were to fail, the solenoid would be de-energized allowing the coil springs to force the friction clutch assembly to become engaged. Therefore the pump would operate with the impeller driven by the pulley member through the clutch assembly, thus preventing overheating.

Figure 6:
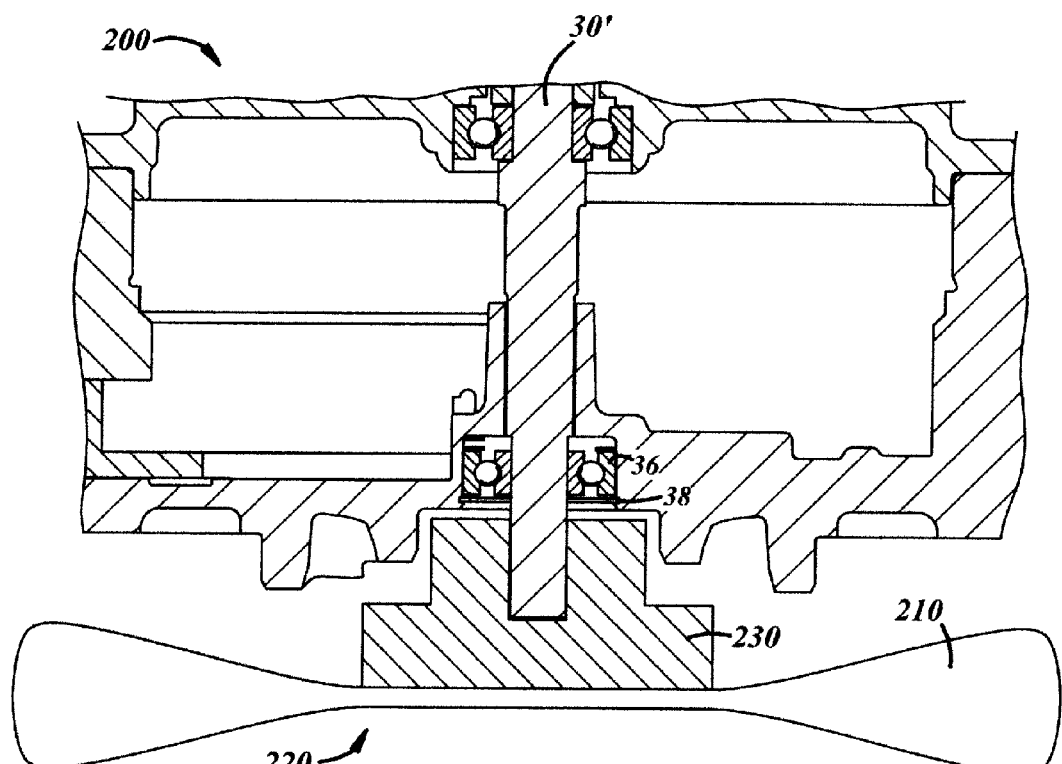
FIG. 6 depicts another embodiment of the invention.

FIG. 6 schematically depicts the use of the inventive friction clutch for operating a cooling fan. The cooling fan accessory mechanism is referred to generally by the reference numeral 200.

The friction clutch mechanism is substantially the same as the friction clutch mechanism described above which is utilized to selectively rotate a water pump impeller. In this embodiment, the friction clutch mechanism is utilized to rotate a cooling fan 210. The components which are the same are referred to by the same reference numerals as set forth above in the other Figures. The main differences are that the shaft member 30', when activated, rotates a cooling fan assembly 220. The fan assembly includes a cooling fan 210 which has a number of blade members and central hub member 230. The hub member is securely attached to the shaft member 30', and the fan 210 is securely attached to the hub member 230 in a conventional manner, such that the housing, fan and blades will rotate when the shaft member rotates and at the same speed. Any conventional means or mechanisms can be utilized to attach the components together so they all rotate together.

Although the invention has been described with respect to preferred embodiments, it is to be also understood that it is not to be so limited since changes and modifications can be made therein which are within the full scope of this invention as detailed by the following claims.

What is claimed is:

1. An accessory drive assembly comprising:
   a housing;
   an input member that is rotatable relative to the housing about an axis;
   a shaft received in the housing and rotatable about the axis;
   a solenoid assembly that is coupled to the housing and disposed about the shaft, the solenoid assembly having an electromagnetic coil;
   a friction plate that is non-rotatably but slidably disposed on the shaft, the friction plate being movable along the axis between a first friction plate position, in which the friction plate is coupled to the input member for common rotation, and a second friction plate position in which the friction plate is decoupled from the input member;
   an armature coupled to the input member for rotation therewith, the armature being disposed about the shaft and movable along the axis relative to the shaft between a first armature position, in which the armature is coupled to the friction plate for common rotation, and a second armature position, the armature having a plurality of spring retaining members; and
   a plurality of coil springs, each of the coil springs being positioned on a corresponding one of the spring retaining members, the coil springs biasing the armature toward the first armature position;
   wherein the electromagnetic coil is selectively operable to generate a magnetic field that causes the armature to move toward the second armature position such that the armature.

2. The accessory drive assembly of claim 1, wherein the accessory drive assembly provides a flux path for axially moving the armature when the the magnetic field is generated by the electromagnetic coil, the flux path comprising a path through said solenoid assembly, said input member, said armature, back to said input member and then back to said solenoid assembly.

3. The accessory drive assembly of claim 1, further comprising a return spring member for biasing the friction plate axially toward the second friction plate position.

4. The accessory drive assembly of claim 1, further comprising one of an impeller and a fan that is coupled to the shaft for rotation therewith.

5. The accessory drive assembly of claim 1, further comprising a stop member that is fixedly coupled to the shaft, wherein the friction plate comprises a plate member, and wherein the stop member limits movement of the plate member in direction along the axis.

6. The accessory drive assembly of claim 5, wherein the stop member is press fit on the shaft.

7. The accessory drive assembly of claim 5, wherein one of the plate member and the stop member defines a plurality of openings spaced circumferentially around the axis, and wherein the other one of the plate member and the stop member defines a plurality of lugs that are spaced circumferentially around the axis, and wherein each of the lugs is slidably received into a corresponding one of the openings.

8. The accessory drive assembly of claim 1, wherein the friction plate comprises a plate member and a pair of friction lining members coupled to opposite axial sides of the plate member.

9. The accessory drive assembly of claim 8, wherein each of said friction lining members comprise annular rings of friction lining material.

10. The accessory drive assembly of claim 1, further comprising a cover that is coupled to the input member for common rotation, and wherein the friction plate is frictionally engaged to the cover when the friction plate is in the first friction plate position.

11. The accessory drive assembly of claim 10, wherein an attachment is employed to couple the cover to the input member, wherein the attachment is selected from a group consisting of press-fits, roll-overs, welding and combinations thereof.

12. The accessory drive assembly of claim 10, wherein the input member is a pulley.

13. The accessory drive assembly of claim 10, wherein the armature is directly mounted to the cover.

14. The accessory drive assembly of claim 13, wherein one of the cover and the armature includes a plurality of tabs and wherein the other one of the cover and the armature defines a plurality of notches into which the tabs are received to thereby non-rotatably but axially slidably couple the armature to the cover.

15. An accessory drive comprising:
a housing;
a shaft received through the housing, the shaft being rotatable about an axis;
a solenoid assembly having an electromagnetic coil, the solenoid assembly being coupled to the housing and disposed about the shaft;
an input member that is rotatable relative to the housing about the axis;
a cover coupled to the input member and rotatable therewith, the cover cooperating with the input member to define a clutch cavity;
an armature that is disposed about the shaft and received in the clutch cavity, the armature being movable along the axis between a first armature position and a second armature position;
biasing members biasing the armature toward the first armature position;
a friction plate having a plate member, the plate member being non-rotatably but axially slidably received on the shaft, the friction plate being movable between a first friction plate position and a second friction plate position; and a stop member fixedly coupled to the shaft, the plate member being non-rotatably but axially slidably mounted on the stop member;
wherein the armature positions the friction plate into frictionally engagement with the cover when the armature is in the first armature position, wherein the electromagnetic coil is selectively operable to generate a magnetic field that causes the armature to move toward the second armature position to de-engage the friction plate and the cover;
wherein the stop member restricts axial movement of the friction plate member when the armature moves toward the second armature position in response to the magnetic field that is generated by the electromagnetic coil.

16. The accessory drive assembly of claim 15, wherein the stop member is press fit on said shaft.

17. The accessory drive assembly of claim 15, wherein one of the plate member and the stop member defines a plurality of openings spaced circumferentially around the axis, and wherein the other one of the plate member and the stop member defines a plurality of lugs that are spaced circumferentially around the axis, and wherein each of the lugs is slidably received into a corresponding one of the openings.

18. The accessory drive assembly of claim 15, wherein the accessory drive assembly provides a flux path for axially moving the armature when the the magnetic field is generated by the electromagnetic coil, the flux path comprising a path through said solenoid assembly, said input member, said armature, back to said input member and then back to said solenoid assembly.

19. The accessory drive assembly of claim 15, further comprising a return spring that biases the toward the second friction plate position.

20. The accessory drive assembly of claim 15, wherein the input member defines a plurality of openings that are disposed circumferentially about the axis, the openings being disposed in-line with the electromagnetic coil and the armature.

21. The accessory drive assembly of claim 15, wherein one of the cover and the armature includes a plurality of tabs and wherein the other one of the cover and the armature defines a plurality of notches into which the tabs are received to thereby non-rotatably but axially slidably couple the armature to the cover.

22. The accessory drive assembly of claim 15, wherein an attachment is employed to couple the cover to the input member, wherein the attachment is selected from a group consisting of press-fits, roll-overs, welding and combinations thereof.

23. The accessory drive assembly of claim 15, further comprising one of an impeller and a fan that is coupled to the shaft for rotation therewith.

24. The accessory drive assembly of claim 15, wherein the input member is a pulley.

* * * * *